US012142867B2

(12) United States Patent
Rétho

(10) Patent No.: US 12,142,867 B2
(45) Date of Patent: Nov. 12, 2024

(54) FEMALE CONTACT WITH STAMPED BEAMS AND METHOD OF MANUFACTURE

(71) Applicant: HYPERTAC S.A., Saint-Aubin-lès-Elbeuf (FR)

(72) Inventor: Patrice Rétho, Saint-Aubin-lès-Elbeuf (FR)

(73) Assignee: HYPERTAC S.A., Saint-Aubin-lès-Elbeuf (FR)

(*) Notice: Subject to any disclaimer, the term of this patent is extended or adjusted under 35 U.S.C. 154(b) by 313 days.

(21) Appl. No.: 17/625,256

(22) PCT Filed: Jul. 8, 2020

(86) PCT No.: PCT/GB2020/051637

§ 371 (c)(1),
(2) Date: Jan. 6, 2022

(87) PCT Pub. No.: WO2021/005362

PCT Pub. Date: Jan. 14, 2021

(65) Prior Publication Data

US 2022/0271461 A1 Aug. 25, 2022

(30) Foreign Application Priority Data

Jul. 10, 2019 (GB) ...................................... 1909908

(51) Int. Cl.
*H01R 13/187* (2006.01)
*H01R 13/03* (2006.01)
*H01R 43/16* (2006.01)

(52) U.S. Cl.
CPC ........... *H01R 13/187* (2013.01); *H01R 13/03* (2013.01); *H01R 43/16* (2013.01)

(58) Field of Classification Search
CPC ....... H01R 13/187; H01R 13/02; H01R 43/16
(Continued)

(56) References Cited

U.S. PATENT DOCUMENTS 4,002,400 A * 1/1977 Evans .................. H01R 13/187 439/748
5,135,417 A * 8/1992 Stanevich .............. H01R 13/03 439/851
(Continued)

FOREIGN PATENT DOCUMENTS

CN 2501199 Y 7/2002
CN 1543012 A 11/2004
(Continued)

OTHER PUBLICATIONS

European Examination Report, Application No. 20751624.6, dated Oct. 27, 2023, 6 pps.
(Continued)

*Primary Examiner* — Peter G Leigh
(74) *Attorney, Agent, or Firm* — Armstrong Teasdale LLP

(57) ABSTRACT

A female electrical contact for an electrical connector includes a conductive socket for a male electrical contact, including an opening, a peripheral wall and a bottom; and a stamped crown including a plurality of stamped conductive beams, the plurality of beams substantially regularly located along the peripheral wall in the socket, each beam having a main direction of extension substantially from the opening to the bottom of the socket, and including a plurality of corrugations along the main direction of extension, the corrugations including summits towards inside the socket and valleys towards the peripheral wall, wherein each beam is configured to elastically deform when coming into contact with the male contact on relative displacement of the male contact towards the bottom of the socket, and to contact the male electrical contact on a plurality of the summits of the corrugations when the male electrical contact is inserted in the socket.

15 Claims, 3 Drawing Sheets

(58) Field of Classification Search
USPC .......................................................... 439/852
See application file for complete search history.

(56) References Cited

U.S. PATENT DOCUMENTS

| | | | | | |
|---|---|---|---|---|---|
| 5,634,829 | A * | 6/1997 | Kerul | H01R 13/193 439/842 |
| 5,645,459 | A * | 7/1997 | Fitting | H01R 13/11 439/852 |
| 5,649,837 | A * | 7/1997 | Arnold | H01R 13/6315 439/247 |
| 5,730,628 | A | 3/1998 | Hawkins | |
| 8,678,867 | B2 * | 3/2014 | Glick | H01R 13/111 439/843 |
| 8,876,562 | B2 * | 11/2014 | Glick | H01R 13/187 439/843 |
| 9,608,341 | B2 * | 3/2017 | Saur | H01R 13/187 |
| 9,735,490 | B2 * | 8/2017 | Wu | H01R 13/113 |
| 10,008,800 | B2 * | 6/2018 | Inoue | H01R 13/42 |
| 10,193,257 | B1 * | 1/2019 | Hirakawa | H01R 13/111 |
| 10,205,261 | B2 * | 2/2019 | Machida | H01R 13/187 |
| 2009/0197482 | A1 * | 8/2009 | Mark | H01R 43/16 439/852 |
| 2019/0036260 | A1 * | 1/2019 | Szymura | H01R 13/187 |

FOREIGN PATENT DOCUMENTS

| | | | | | |
|---|---|---|---|---|---|
| CN | 101340033 | A | | 1/2009 | |
| CN | 202405473 | U | * | 8/2012 | |
| CN | 102714370 | A | | 10/2012 | |
| CN | 103636071 | A | | 3/2014 | |
| CN | 104505620 | A | | 4/2015 | |
| CN | 205595497 | U | | 9/2016 | |
| CN | 205693016 | U | | 11/2016 | |
| CN | 106654652 | A | * | 5/2017 | H01R 13/02 |
| CN | 106654727 | A | * | 5/2017 | |
| CN | 107369937 | A | | 11/2017 | |
| CN | 107819225 | A | * | 3/2018 | H01R 13/11 |
| CN | 108448288 | A | | 8/2018 | |
| CN | 108963506 | A | * | 12/2018 | |
| CN | 208368847 | U | | 1/2019 | |
| CN | 109638514 | A | | 4/2019 | |
| JP | H1167310 | A | | 3/1999 | |
| JP | 2011511418 | A | | 4/2011 | |
| JP | 2013171739 | A | | 9/2013 | |
| JP | 2016529675 | A | | 9/2016 | |

OTHER PUBLICATIONS

China First Office Action, Application No. 202080049878.8, dated Nov. 16, 2023, 27 pps.: with English translation.

International Search Report and Written Opinion, PCT/GB2020/051637, Sep. 22, 2020, 11 pages.

U.K. Search Report under Section 17(5), Application No. GB1909908.4, Jan. 3, 2020, 6 pages.

Japanese Office Action, Application No. 2022-501056, dated Jul. 16, 2024, 7 pps.: with English translation.

* cited by examiner

FEMALE CONTACT WITH STAMPED BEAMS AND METHOD OF MANUFACTURE

CROSS-REFERENCE TO RELATED APPLICATIONS

This patent application is a National Stage Entry of PCT/GB2020/051637 filed on Jul. 8, 2020, which claims priority to GB Application No. 1909908.4 filed on Jul. 10, 2019, the disclosures of which are hereby incorporated by reference herein in their entirety as part of the present application.

FIELD OF DISCLOSURE

The disclosure relates, but is not limited to, a female electrical contact for an electrical connector, including a conductive socket for a male electrical contact. The disclosure also relates to a method of manufacture of such a contact.

BACKGROUND

An electrical connector usually includes at least one contact fitted in an insulator. The at least one contact may include a female contact (e.g. including a socket) configured to be mated with a male contact (e.g. a pin) and/or may include a male contact (e.g. a pin) configured to be mated with a female contact (e.g. including a socket).

An electrical plug usually includes a mobile connector. The electrical plug may include male contacts (e.g. including pins) and/or female contacts (e.g. including sockets). An electrical receptacle usually includes a fixed connector (e.g. fixed in a wall). The electrical receptacle may include male contacts (e.g. including pins) and/or female contacts (e.g. including sockets). The electrical plug may be mated with the electrical receptacle.

SUMMARY

Aspects and embodiments of the disclosure are set out in the appended claims. These and other aspects and embodiments of the disclosure are also described herein.

In one aspect, a female electrical contact for an electrical connector is provided. The contact includes a conductive socket for a male electrical contact, the conductive socket including an opening, a peripheral wall, and a bottom. The contact further includes a stamped crown including a plurality of stamped conductive beams, the plurality of beams substantially regularly located along the peripheral wall in the socket, each beam having a main direction of extension substantially from the opening to the bottom of the socket, and including a plurality of corrugations along the main direction of extension, the corrugations including summits towards inside the socket and valleys towards the peripheral wall, wherein each beam is configured to elastically deform when coming into contact with the male contact on relative displacement of the male contact towards the bottom of the socket, and to contact the male electrical contact on a plurality of the summits of the corrugations when the male electrical contact is inserted in the socket.

In another aspect, a method is provided. The method includes providing a conductive socket for a male electrical contact, the socket including an opening, a peripheral wall and a bottom, and stamping a conductive crown, the crown including a plurality of stamped conductive beams including a plurality of corrugations. The method further includes placing the stamped crown in the socket, such that: the plurality of beams are substantially regularly located along the peripheral wall in the socket, each beam has a main direction of extension substantially from the opening to the bottom of the socket, and the plurality of corrugations extend along the main direction of extension, the corrugations including summits towards inside the socket and valleys towards the peripheral wall, and each beam is configured to elastically deform when coming into contact with the male contact on relative displacement of the male contact towards the bottom of the socket, and to contact the male electrical contact on a plurality of the summits of the corrugations when the male electrical contact is inserted in the socket.

BRIEF DESCRIPTION OF THE DRAWINGS

Aspects of the disclosure will now be described, by way of example, with reference to the accompanying drawings in which.

In the drawings, similar elements bear identical numerical references.

DETAILED DESCRIPTION

Overview

The disclosure relates but is not limited to a female electrical contact for an electrical connector. The female contact includes a stamped conductive crown including stamped conductive beams. The beams are located in a socket of the female electrical contact. The beams include a plurality of corrugations, to contact a tip of a male electrical contact inserted in the socket.

The disclosure also relates to a method of manufacture of the socket.

The plurality of conductive beams and the plurality of corrugations provide a plurality of electrical contacts and ensure a reliable electrical connection with the male contact. The plurality of beams are substantially regularly located along a peripheral wall in the socket and may cover substantially a majority of a surface area of the peripheral wall (for example more than 50%, e.g. more than 75%, and for instance more than 90% of the surface area of the peripheral wall). As will be apparent from the disclosure, in some examples the layout of the beams in the socket tends to maximize a surface area of the peripheral wall covered by the beams. The plurality of beams and the plurality of corrugations ensure an enhanced reliable electrical connection with the male contact.

The crown and the conductive beams are stamped and are easy to manufacture, at a low cost. In some examples the crown may be located at an opening of the socket and the female contact is easy to assemble.

Detailed Description of Example Embodiments

Figure 1B:
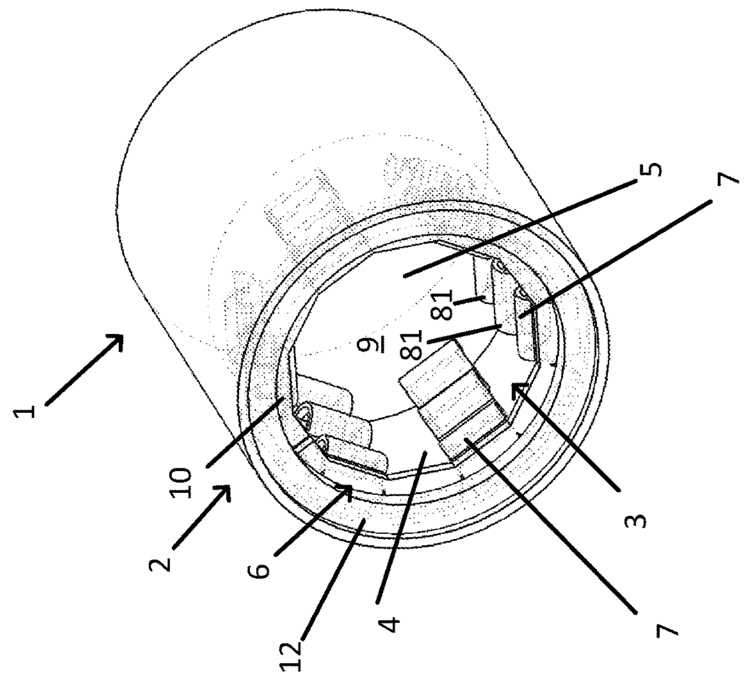
FIG. 1B is an elevation view, in perspective, which schematically illustrates the example female contact of FIG. 1A.
Figure 1A:
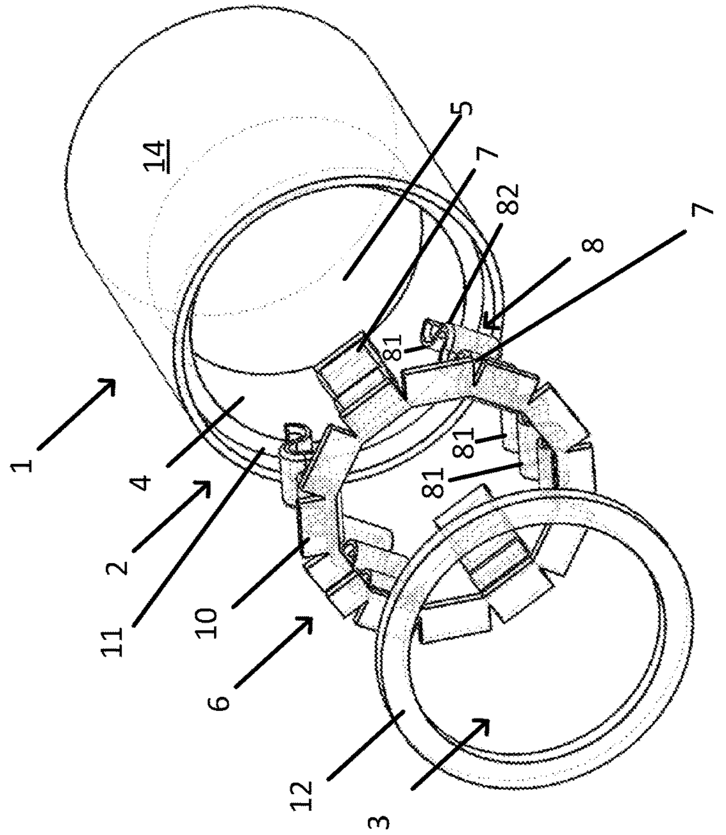
FIG. 1A is an elevation scattered view, in perspective, which schematically illustrates an example female contact including a first example stamped crown.

FIGS. 1A and 1B schematically illustrate a female electrical contact 1 for an electrical connector (not shown on the Figures).

The contact 1 includes a conductive socket 2 for a male electrical contact (not shown on the Figures). In the figures, the socket 2 has a general shape of a cylinder of revolution, but other shapes are envisaged, and cylinders which are not of revolution are also envisaged.

The socket 2 includes an opening 3 for insertion of the male contact in the female contact, a peripheral wall 4 and bottom 5. Both the peripheral wall 4 and the bottom 5 are conductive. In some examples the bottom 5 is substantially flat.

The female electrical contact 1 further includes a stamped crown 6 including a plurality of stamped conductive beams 7.

As illustrated in FIGS. 1A and 1B, the plurality of beams 7 is substantially regularly located along the peripheral wall 4 in the socket 2. The plurality of beams 7 may cover substantially a majority of a surface area of the peripheral wall 4 (for example more than 50%, e.g. more than 75%, and for instance more than 90% of the surface area of the peripheral wall). In some examples the layout of the beams in the socket tends to maximize a surface area of the peripheral wall covered by the beams. The plurality of beams and the plurality of corrugations ensure an enhanced reliable electrical connection with the male contact.

In some examples, each beam 7 may have a main direction of extension substantially from the opening 3 to the bottom 5 of the socket 2.

As illustrated in the Figures, each beam 7 may include a plurality of corrugations 8 along the main direction of extension of the beam 7.

The corrugations 8 include summits 81 towards inside the socket 2 and valleys 82 towards the peripheral wall 4. In the examples of the Figures, each beam includes three corrugations. Other numbers of corrugations may be envisaged. As a non-limiting example, each beam 7 may include a number N of corrugations such that:

$$2<N\leq 10.$$

Each beam 7 is configured to elastically deform when coming into contact with the male contact on relative displacement of the male contact towards the bottom 5 of the socket 2. Each beam 7 is configured to contact the male electrical contact on a plurality of the summits 81 of the corrugations 8 when the male electrical contact is inserted in the socket 2. The plurality of corrugations 8 and the plurality of summits 81 provide a plurality of electrical contacts and ensure a reliable electrical connection with the male contact.

Figure 2B:
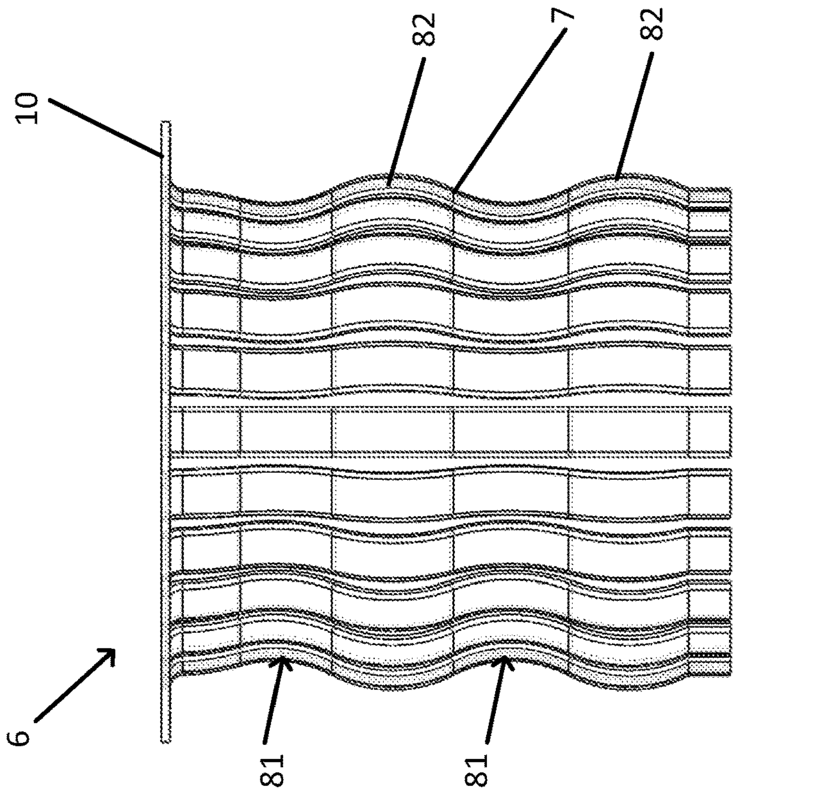
FIG. 2B is a side view which schematically illustrates the example crown of FIG. 2A.
Figure 2A:
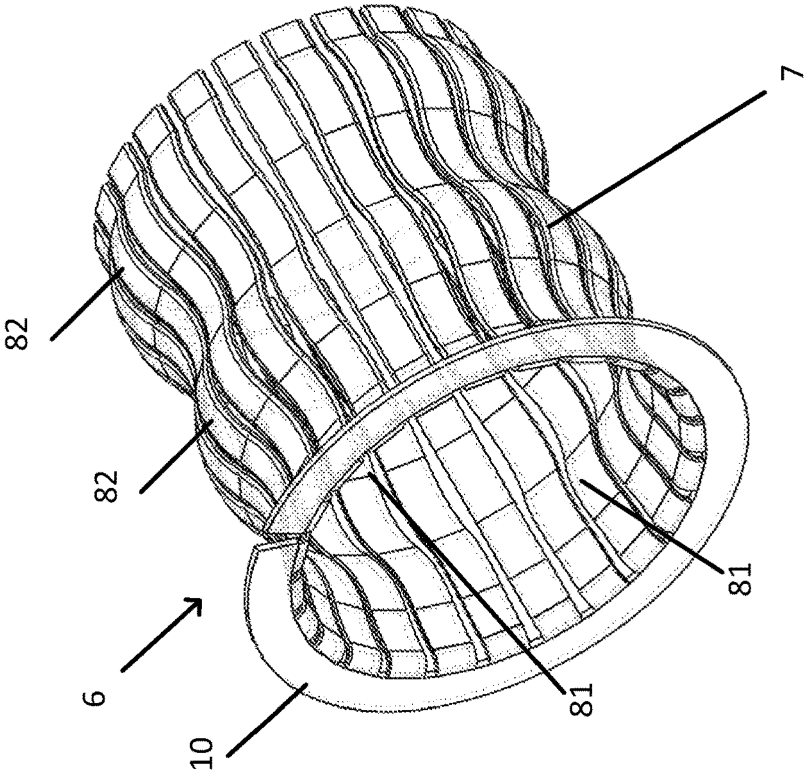
FIG. 2A is an elevation view, in perspective, which schematically illustrates a second example stamped crown.

In the example illustrated in FIGS. 1A and 1B, the crown 6 includes six beams 7. In the example illustrated in FIGS. 2A and 2B, the crown 6 includes twenty-four beams 7. Other number of beams may be envisaged. The number of beams 7 may be such that the plurality of conductive beams 7 includes between 3 and 90 beams, as non limiting examples.

In some examples, each beam 7 may be in contact with the peripheral wall 4. In some examples, the valleys 82 are in contact with the peripheral wall 4.

In some examples, a receiving space for the male contact within the plurality of beams is substantially constant from the opening 3 to the bottom 5 of the socket 2. The receiving space 9 ensures an enhanced reliable electrical connection with the male contact.

As illustrated in the Figures, the stamped crown 6 further includes a stamped base 10 configured to link the plurality of beams 7 together, and to mechanically contact the socket 2 at the opening 3 of the socket 2 for mounting of the stamped crown in the socket 2. As illustrated in FIG. 1A, the stamped base 10 may come into contact with a shoulder 11 in the peripheral wall 4 and may be covered by a fixation ring 12. Other methods may be envisaged, such as by folding a thin wall of the socket on the ring.

As illustrated in the Figures, each beam 7 may define a cantilever attached to the base 10 at the opening 3 of the socket 2. In some examples, the beams are not in contact with the bottom 5 of the socket 2 and enable enhanced elastic deformation of the beams 7 when in contact with the male contact.

In some examples, the beam may be attached to the base at the opening of the socket and may contact the bottom of the socket.

The female contact 1 may be configured to sustain currents between 1 A and 1000 A, as non-limiting examples.

The crown 6 may be made of material including: copper alloys, such as copper beryllium, as non-limiting examples.

The crown 6 may have dimensions such as: a diameter may be between 5 mm and 30 mm, such as 12 mm, and a height may be between 5 mm and 30 mm, such as 13 mm. The beams may have a width between 0.3 mm and 15 mm, such as 1 mm as non-limiting examples.

The disclosure also relates to a method 100 of manufacture of the socket.

Figure 3:
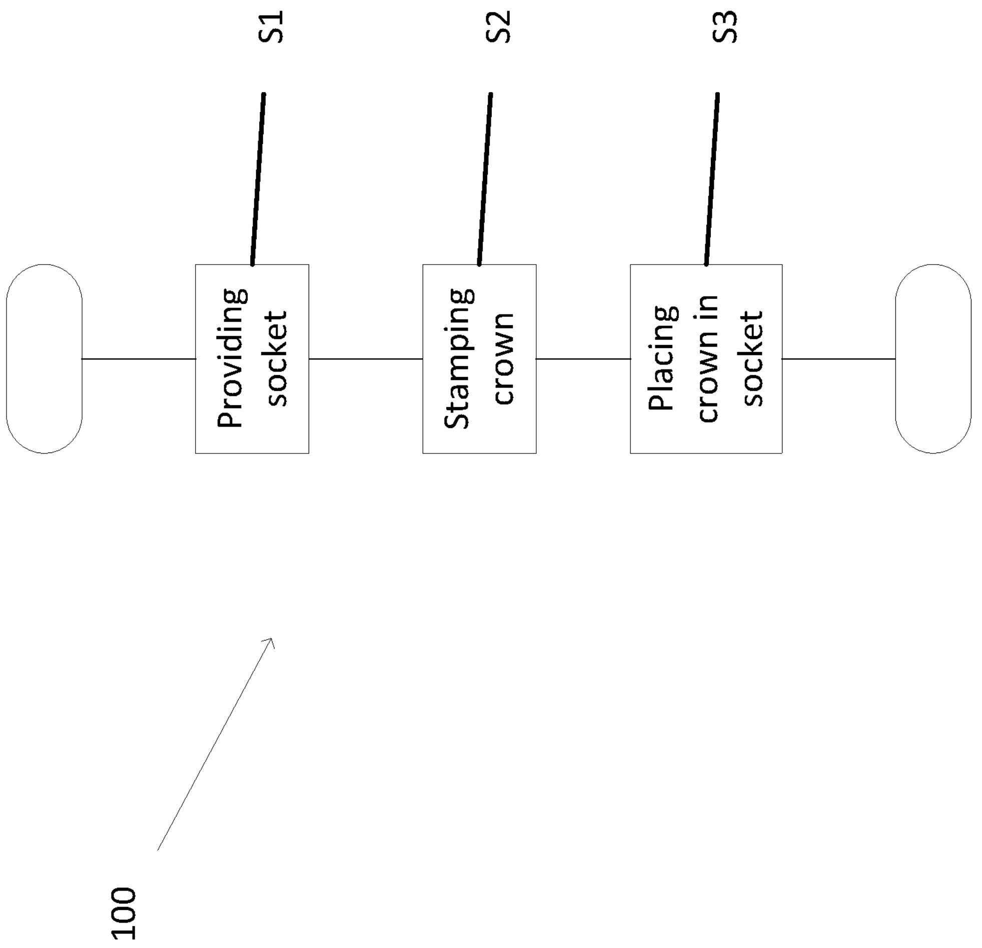
FIG. 3 schematically illustrate example steps of a method of manufacture of a contact of any one of the aspects of the disclosure.

As illustrated in FIG. 3, the method 100 includes:

providing, at S1, a conductive socket for a male electrical contact, the socket including an opening, a peripheral wall and a bottom;

stamping, at S2, a conductive crown, the crown including a plurality of stamped conductive beams including a plurality of corrugations; and placing, at S3, the stamped crown in the socket, such that the plurality of beams are substantially regularly located along the peripheral wall in the socket, each beam has a main direction of extension substantially from the opening to the bottom of the socket, and the plurality of corrugations extend along the main direction of extension, the corrugations including summits towards inside the socket and valleys towards the peripheral wall, and each beam is configured to elastically deform when coming into contact with the male contact on relative displacement of the male contact towards the bottom of the socket, and to contact the male electrical contact on a plurality of the summits of the corrugations when the male electrical contact is inserted in the socket.

The contact manufactured by the method 100 may be the contact according to any of the aspects of the disclosure.

As illustrated in FIG. 1A, in some example S3 may include a step of placing the stamped crown 6 at the opening 3 of the socket 2 by blocking the crown 6 with the ring 12 on top of the base 10 or with a thin wall designed in the socket and folded on top of the crown. The ring 12 may be placed in force into a barrel 14 forming part of the connector in which the contact is placed, but other methods, such as gluing, are envisaged.

The crown may also be used in combination with other means to enhance electrical contact with a male contact.

The invention claimed is:

1. A female electrical contact for an electrical connector, comprising:

a conductive socket for a male electrical contact, the conductive socket comprising an opening, a peripheral wall, and a bottom; and a stamped crown comprising:

a plurality of stamped conductive beams, the plurality of beams substantially regularly located along the peripheral wall in the socket, each beam having a main direction of extension substantially from the opening to the bottom of the socket, and comprising a plurality of corrugations along the main direction of extension, the corrugations comprising summits towards inside the socket and valleys towards the peripheral wall, and a stamped base configured to link the plurality of beams together and to mechanically contact the socket at the opening of the socket for mounting of the stamped crown in the socket, wherein each beam defines a cantilever attached to the base at the opening of the socket, wherein each beam is configured to elastically deform when coming into contact with the male contact on relative displacement of the male contact towards the bottom of the socket, and to contact the male electrical contact on a plurality of the summits of the corrugations when the male electrical contact is inserted in the socket.

2. The contact of claim 1, wherein the plurality of conductive beams comprises between 3 and 90 beams.

3. The contact of claim 1, wherein the valleys are in contact with the peripheral wall.

4. The contact of claim 1, wherein each beam is attached to the base at the opening of the socket.

5. The contact of claim 1, wherein the contact is configured to sustain currents between 1A and 1000A.

6. The contact of claim 1, wherein the crown is made of at least one copper alloy.

7. The contact of claim 1, wherein the crown has a diameter between 5 mm and 30 mm, and a height between 5 mm and 30 mm.

8. The contact of claim 1, wherein each beam comprises a number N of corrugations such that:

$$2<N\leq 10.$$

9. The contact of claim 1, wherein a receiving space for the male contact within the plurality of beams is substantially constant from the opening to the bottom of the socket.

10. The contact of claim 1, wherein the plurality of beams is substantially regularly located along the peripheral wall in the socket.

11. The contact of claim 1, wherein the plurality of beams covers substantially a majority of a surface area of the peripheral wall.

12. The contact of claim 1, wherein the beams have a width between 0.3 mm and 15 mm.

13. A method comprising:

providing a conductive socket for a male electrical contact, the socket comprising an opening, a peripheral wall and a bottom;

stamping a conductive crown, the crown comprising:

a plurality of stamped conductive beams comprising a plurality of corrugations; and a stamped base configured to link the plurality of beams together; and placing the stamped crown in the socket, such that:

the plurality of beams are substantially regularly located along the peripheral wall in the socket, each beam has a main direction of extension substantially from the opening to the bottom of the socket, and the plurality of corrugations extend along the main direction of extension, the corrugations comprising summits towards inside the socket and valleys towards the peripheral wall, the stamped base is configured to mechanically contact the socket at the opening of the socket, wherein each beam defines a cantilever attached to the base at the opening of the socket, and each beam is configured to elastically deform when coming into contact with the male contact on relative displacement of the male contact towards the bottom of the socket, and to contact the male electrical contact on a plurality of the summits of the corrugations when the male electrical contact is inserted in the socket.

14. The method of claim 13, further comprising placing the stamped crown at the opening of the socket by blocking the crown with a ring on top of the crown or a thin wall designed in the socket and folded on top of the crown.

15. The method of claim 14, wherein the ring is placed in force and/or glued into a barrel forming part of connector in which the contact is placed.

* * * * *